(12) United States Patent
Deng et al.

(10) Patent No.: US 10,951,110 B2
(45) Date of Patent: Mar. 16, 2021

(54) CONTROL METHOD AND DEVICE FOR ALTERNATING-CURRENT AND DIRECT-CURRENT CONVERSION CIRCUIT, AND COMPUTER STORAGE MEDIUM

(71) Applicants: Global Energy Interconnection Research Institute CO., LTD., Beijing (CN); STATE GRID CORPORATION OF CHINA, Beijing (CN)

(72) Inventors: Zhanfeng Deng, Beijing (CN); Jun Ge, Beijing (CN); Guoliang Zhao, Beijing (CN); Jieying Song, Beijing (CN); Weiguo Li, Beijing (CN); Zhengang Lu, Beijing (CN); Yunfei Xu, Beijing (CN); Zhe Zhou, Beijing (CN); Haijun Liu, Beijing (CN); Dong Liang, Beijing (CN); Xiaolin Mo, Beijing (CN); Pengliang Xu, Beijing (CN); Guofu Chen, Beijing (CN); Xiang Wang, Beijing (CN); Guozhong Zhang, Beijing (CN); Weidong Shen, Beijing (CN); Wenyuan Ning, Beijing (CN); Feng Wang, Beijing (CN)

(73) Assignees: Global Energy Interconnection Research Institute Co., Ltd, Beijing (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 16/613,268

(22) PCT Filed: Jul. 12, 2018

(86) PCT No.: PCT/CN2018/095509
§ 371 (c)(1),
(2) Date: Nov. 13, 2019

(87) PCT Pub. No.: WO2019/019925
PCT Pub. Date: Jan. 31, 2019

(65) Prior Publication Data
US 2020/0195126 A1    Jun. 18, 2020

(30) Foreign Application Priority Data
Jul. 25, 2017    (CN) .................. 201710610608.X (51) Int. Cl.
*H02M 1/14*         (2006.01)
*H02M 1/08*         (2006.01)
(Continued)

(52) U.S. Cl.
CPC ............ *H02M 1/143* (2013.01); *H02M 1/08* (2013.01); *H02M 1/15* (2013.01); *H02M 7/2173* (2013.01);
(Continued)

(58) Field of Classification Search
CPC combination set(s) only.
See application file for complete search history.

(56) References Cited

U.S. PATENT DOCUMENTS

| 9,496,797 B2 | 11/2016 | Panov et al. | |
| 2015/0333637 A1* | 11/2015 | Izumi | H02M 7/219 363/21.01 |

(Continued)

FOREIGN PATENT DOCUMENTS

| CN | 203039584 U | 7/2013 |
| CN | 103904908 A | 7/2014 |

(Continued)

OTHER PUBLICATIONS

Wang, Xiong et al., "Rearch on Dual-Phase-Shifting Control Strategy Based on Optimal Reflux Power Control", School of Electrical Engineering, Hebei University of Technology, Tianjin 300130, China, No. 6, 2017, pp. 67-70 [English Abstract only].

(Continued)

*Primary Examiner* — Emily P Pham (74) *Attorney, Agent, or Firm* — BakerHostetler (57) ABSTRACT

Disclosed in embodiments of the present invention are a control method and device for an alternating-current and direct-current conversion circuit, and a computer storage medium. The alternating-current and direct-current conversion circuit comprises a first commutation unit, a second commutation unit, and a coupling unit. By obtaining voltage information and current information of the alternating-current and direct-current conversion circuit, a controllable device of the first commutation unit can be controlled to be turned on in delay or turned off in advance; and the second commutation unit is controlled to work in a controllable rectification state or a controllable inversion state or an uncontrollable rectification state.

15 Claims, 5 Drawing Sheets

(51) Int. Cl.
| | | |
|---|---|---|
| *H02M 1/15* | (2006.01) | |
| *H02M 7/217* | (2006.01) | |
| *H02M 7/493* | (2007.01) | |
| *H02M 1/00* | (2006.01) | |

(52) U.S. Cl.
CPC .... *H02M 7/493* (2013.01); *H02M 2001/0006* (2013.01)

(56) References Cited

U.S. PATENT DOCUMENTS

| | | | |
|---|---|---|---|
| 2015/0365005 A1 | 12/2015 | Panov et al. | |
| 2016/0233778 A1* | 8/2016 | Sanada | H02M 3/335 |
| 2017/0005565 A1* | 1/2017 | Bai | H02M 5/4585 |
| 2018/0278149 A1* | 9/2018 | Sano | H02M 1/4208 |
| 2020/0274456 A1* | 8/2020 | Tanaka | H02M 7/483 |

FOREIGN PATENT DOCUMENTS

| | | | |
|---|---|---|---|
| CN | 106100361 A | 11/2016 | |
| CN | 107565834 A | 1/2018 | |
| JP | H066976 A | 1/1994 | |
| WO | WO-2017208639 A1 * | 12/2017 | H02J 7/007 |

OTHER PUBLICATIONS

English translation of International Search Report issued in PCT/CN2018/095509, dated Sep. 7, 2018.
English translation of Written Opinion issued in PCT/CN2018/095509, dated Sep. 7, 2018.

\* cited by examiner

CONTROL METHOD AND DEVICE FOR ALTERNATING-CURRENT AND DIRECT-CURRENT CONVERSION CIRCUIT, AND COMPUTER STORAGE MEDIUM

CROSS-REFERENCE TO RELATED APPLICATIONS

The present application is a National Stage of International Patent Application No. PCT/CN2018/095509, filed Jul. 12, 2018 which is based on and claims priority to Chinese Patent Application No. 201710610608.X, filed on Jul. 25, 2017. The disclosures of which are hereby incorporated by reference in their entireties.

TECHNICAL FIELD

The disclosure relates to the technical field of power, and in particular, to a method and apparatus for controlling an alternating current/direct current (AC/DC) conversion circuit, and a computer storage medium.

BACKGROUND

As a novel power distribution transformer, a power electronic transformer realizes AC/DC conversion by using a power electronic conversion technology and a high-frequency transformer, for usage needs of grid users. By using the high-frequency transformer, not only a volume and a weight of the power electronic transformer are greatly reduced, but also pollution to the environment is reduced. Meanwhile, since an output voltage of a secondary side is constant, it does not change due to a change of load. Therefore, the controllability is high, and the voltage, current and power factors of primary and secondary sides of the transformer can be controlled.

In related arts, there are mainly two implementation manners of an AC/DC conversion circuit of a power electronic transformer of a modular structure. One implementation manner is that an H-bridge chain structure is adopted in a high-voltage side. A DC side of an H-bridge module adopts a Dual Active Bridge (DAB) structure, and DC/DC conversion is achieved through a single-phase high-frequency transformer. The other implementation manner is that AC/DC conversion is completed by using a traditional Modular-Multilevel-Converter (MMC), and then DC/DC conversion is completed by capacitive voltage division and by further using the DAB structure with a single-phase high-frequency transformer. However, both of these implementation manners have the following problems. Due to power fluctuations in a single phase, capacitors of the DC side generate voltage fluctuations. Excessive voltage fluctuations may have a very adverse effect on the device. In addition, in the power electronic transformer using the MMC structure, regulation of a medium-voltage DC side is achieved by connecting capacitors in series, which not only lead to a large volume, but also bring difficulties in performing voltage equalization control.

By using various forms of intermediate-frequency or high-frequency transformers as coupling units, sub-modules DC/AC in the power electronic transformer of modular structure are cascaded together, and fluctuating power between three phase modules can be canceled by the coupling unit, but a module capacitance, a reactance of the coupling unit and an operating frequency of a DC/AC stage all affect voltage fluctuation of a module capacitor and the voltage and current phase of the coupling unit.

SUMMARY

The embodiments of the disclosure are directed to a method and apparatus for controlling an AC/DC conversion circuit, and a computer storage medium, which at least solve the defects that a device is adversely affected by a large reactive power oscillation inside an AC/DC conversion circuit due to a voltage fluctuation of a capacitor in the AC/DC conversion circuit of a power electronic transformer.

The embodiments of the disclosure provide a method for controlling an AC/DC conversion circuit. The AC/DC conversion circuit includes a first converter unit, a second converter unit and a coupling unit. The first converter unit is connected to an input terminal of the coupling unit. The second converter unit is connected to an output terminal of the coupling unit. The control method may include the following steps.

Voltage information and current information of the AC/DC conversion circuit are acquired.

According to the voltage information and the current information of the AC/DC conversion circuit, a controllable device in the first converter unit is controlled to be switched on in delay or switched off in advance, and the second converter unit is controlled to operate in a controllable rectification state or a controllable inversion state or an uncontrollable rectification state.

In an embodiment, the first converter unit is a DC/AC conversion unit, and the second converter unit is an AC/DC conversion unit. The step of acquiring voltage information and current information of the AC/DC conversion circuit includes the following operations.

A capacitor voltage and a current of the first converter unit are detected.

A fluctuation range of the capacitor voltage or a current fluctuation range of the first converter unit is determined.

In an embodiment, the step of controlling a controllable device in the first converter unit to be switched on in delay or switched off in advance includes the following operations.

It is determined whether the fluctuation range of the capacitor voltage of the first converter unit exceeds a preset voltage range, or the current fluctuation range of the first converter unit exceeds a preset current range.

In response to the fluctuation range of the capacitor voltage of the first converter unit exceeding the preset voltage range, or the current fluctuation range of the first converter unit exceeding the preset current range, the controllable device in the first converter unit is controlled to be switched on in delay or switched off in advance, the range of voltage or current fluctuation determines a size of a dead zone.

In an embodiment, after the voltage information and the current information of the AC/DC conversion circuit are acquired, the method further includes the following steps.

For first converter units of all phases connected to the same coupling unit, a respective capacitor voltage bias of each of the first converter units is calculated.

It is determined whether there is one of the biases that exceeds a preset value.

In response to one of the biases exceeding the preset value, it is determined to lock a trigger pulse of at least one of the phases according to the bias.

In an embodiment, the step of controlling the second converter unit to operate in a controllable rectification state, a controllable inversion state or an uncontrollable rectification state includes the following operations.

It is determined whether the power flowing direction of the coupling unit is unidirection from the input terminal to the output terminal of the coupling unit or bidirection.

In response to the power flowing direction of the coupling unit being unidirection from the input terminal to the output terminal of the coupling unit, a trigger pulse of the second converter unit is locked, and the second converter unit is controlled to operate in the uncontrollable rectification state, and in response to receiving an instruction indicating that the power flowing direction of the second converter unit is bidirection, the trigger pulse of the second converter unit is unlocked, and the second converter unit is controlled to operate in the controllable rectification state or the controllable inversion state.

In an embodiment, the coupling unit includes an intermediate-frequency transformer, and the step of controlling the second converter unit to operate in a controllable rectification state or a controllable inversion state includes the following operations.

In response to the power flowing direction being from the second converter unit to the intermediate-frequency transformer, the second converter unit is controlled to operate in the controllable rectification state, or in response to the power flowing direction being from the intermediate-frequency transformer to the second converter unit, the second converter unit is controlled to operate in the controllable inversion state.

The embodiments of the disclosure further provide an apparatus for controlling an AC/DC conversion circuit, which includes at least one processor and a memory communicated and connected to the at least one processor.

The memory stores an instruction which may be executed by the at least one processor. The instruction is executed by the at least one processor such that the at least one processor performs the above method for controlling an AC/DC conversion circuit.

The embodiments of the disclosure provide the method and apparatus for controlling an AC/DC conversion circuit, and the computer storage medium. The AC/DC conversion circuit includes a first converter unit, a second converter unit and a coupling unit. The first converter unit is connected to an input terminal of the coupling unit. The second converter unit is connected to an output terminal of the coupling unit. By acquiring voltage information and current information of the AC/DC conversion circuit, a controllable device in the first converter unit is controlled to be switched on in delay or switched off in advance meanwhile the second converter unit is controlled to operate in a controllable rectification state, a controllable inversion state or an uncontrollable rectification state. By controlling capacitor voltage fluctuation and a voltage and a current of the coupling unit of the AC/DC conversion circuit, fluctuation of a DC-side capacitor voltage of a module caused by single-phase fluctuation power can be effectively suppressed, thereby preventing over-stressing of the device, solving unbalanced DC-side capacitor voltage in the AC/DC conversion circuit, avoiding a large reactive power oscillation inside the modular AC/DC conversion circuit, and reducing the adverse influence on the device.

BRIEF DESCRIPTION OF DRAWINGS

In order to more clearly illustrate the technical solutions in the specific implementation manners of the disclosure or the conventional art, the drawings used in the description of the embodiments or the conventional art will be briefly described below. It is apparent that the drawings in the following description are some implementation manners of the disclosure, and other drawings can be obtained from those skilled in the art according to these drawings without any creative work.

DETAILED DESCRIPTION

The technical solutions of the disclosure are clearly and completely described in the following with reference to the accompanying drawings. It is apparent that the described embodiments are a part of the embodiments of the disclosure, but not all of the embodiments. All other embodiments obtained by those skilled in the art based on the embodiments of the disclosure without creative efforts fall within the scope of protection of the disclosure.

In the description of the disclosure, it is to be noted that the terms "first" and "second" are used for descriptive purposes only and are not to be construed as indicating or implying relative importance.

Further, the technical features involved in different implementation manners of the disclosure described below may be combined with each other as long as they do not constitute a conflict with each other.

Figure 1:
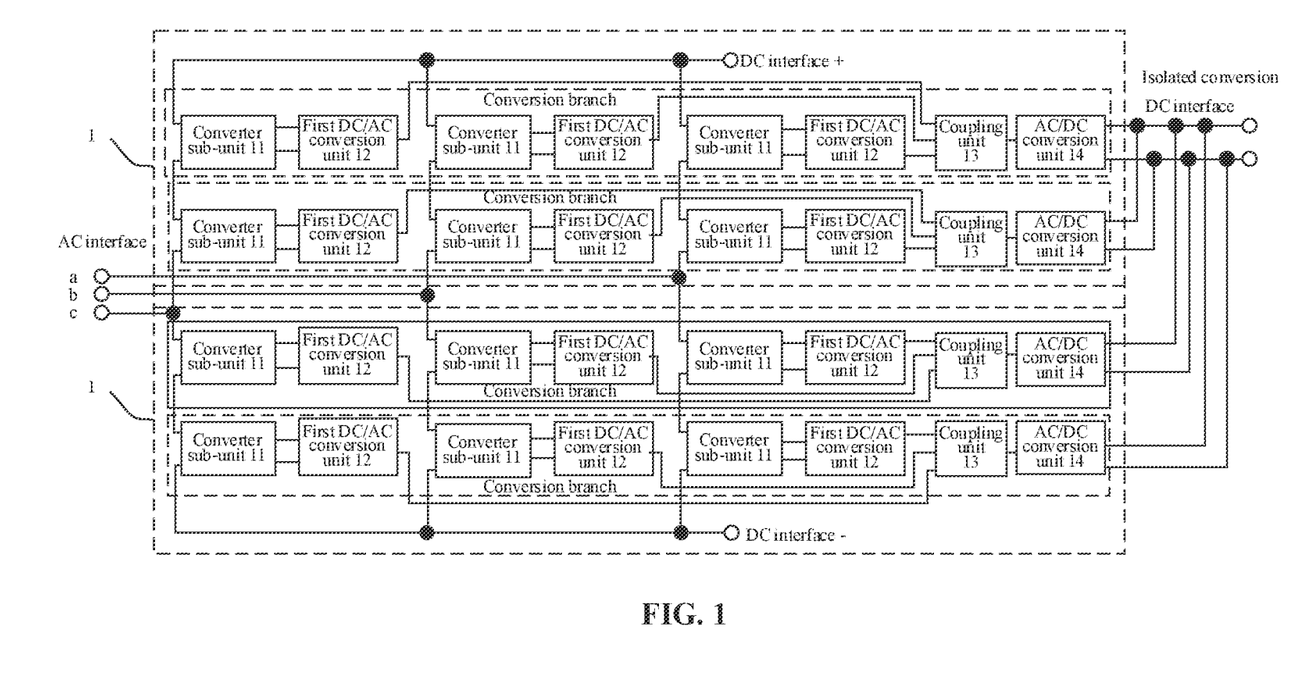
FIG. 1 is a schematic diagram of an AC/DC conversion circuit.

The present embodiment provides a method for controlling an AC/DC conversion circuit. A specific structure of an AC/DC conversion circuit is as shown in FIG. 1. The AC/DC conversion circuit includes at least one AC/DC conversion module 1. Each of the AC/DC conversion modules 1 includes at least one conversion branch. Each of the conversion branches includes: multiple converter sub-units 11, multiple first DC/AC conversion units 12, at least one coupling unit 13, and at least one AC/DC conversion unit 14. Each of the converter sub-units 11 corresponds to a respective one of three phases of AC. Each of the first DC/AC conversion units 12 is connected to a DC side of a respective one of the converter sub-units 11 or a total DC side formed by connecting the DC sides of the converter sub-units 11 in series or in parallel. The coupling unit 13 couples and adds instantaneous power outputted by the first DC/AC conversion unit 12 in each phase to eliminate the fluctuation of the instantaneous power in a single phase. The AC/DC conversion unit 14 is connected to one or more output terminals of the coupling unit 13. The adjacent converter sub-units 11 of the same phase in the AC/DC conversion module 1 are cascaded. An AC interface is led from an AC side of the converter sub-unit 11 in each phase and connected to the corresponding phase of AC.

It can be seen that the AC/DC conversion circuit shown in FIG. 1 includes a first converter unit, a second converter unit and a coupling unit. The first converter unit is connected to an input terminal of the coupling unit. The second converter unit is connected to an output terminal of the coupling unit. Specifically, the first converter unit is a DC/AC conversion unit, that is, a DC/AC converter unit. The first converter unit has a function of converting DC into AC and allowing bi-direction flow of power. The first converter unit can be connected to a DC side of each of various modules such as a half-bridge module, an H-bridge module, a half-bridge double-clamp module and a single-clamp module in parallel so as to convert the of a DC capacitor of the first converter unit into AC, and connected to the input terminal of the coupling unit. The second converter unit is an AC/DC conversion unit, that is, an AC/DC converter unit. The second converter unit has a function of converting AC into DC.

Figure 4:
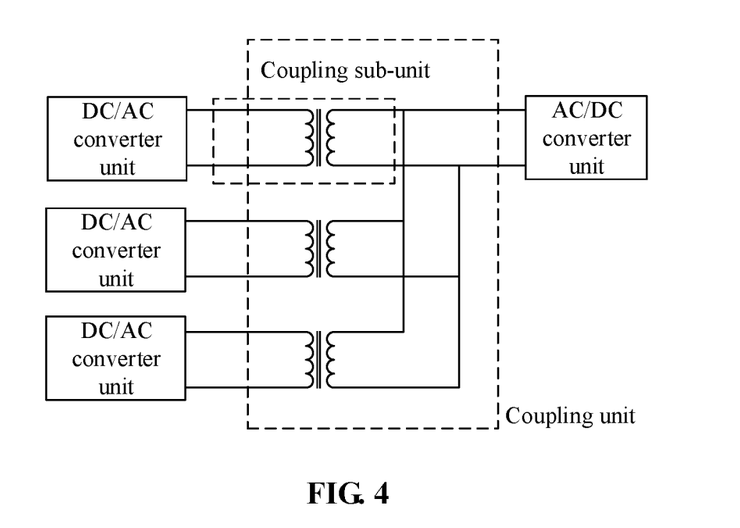
FIG. 4 is a schematic diagram of a coupling unit of an AC/DC conversion circuit according to an embodiment of the disclosure.
Figure 5:
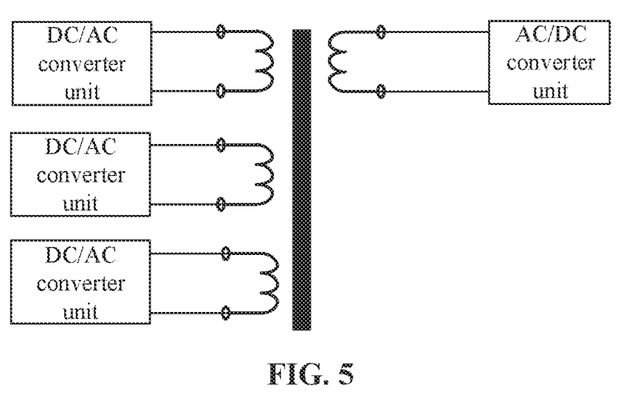
FIG. 5 is a schematic diagram of a coupling unit applied to an AC/DC power electronic transformer according to an embodiment of the disclosure.

As a specific implementation manner, the coupling unit may adopt a connection manner as shown in FIG. 4. At least one coupling sub-unit is included. The coupling unit includes multiple input terminals and at least one output terminal. Each of the input terminals may be connected to the output terminal of each of the DC/AC converter units as needed, or connected to a total output terminal of multiple DC/AC converter units in the same phase connected in series or in parallel. The output terminals of the coupling unit may be connected separately or in series or in parallel to the AC/DC converter units after the AC/DC converter units are connected separately or in series or in parallel. The coupling unit may be applied to an AC/DC power electronic transformer and an AC power electronic transformer. The coupling unit applied to the AC/DC power electronic transformer is shown in FIG. 5. In a form of multi-winding transformer, the DC/AC converter unit and the AC/DC converter unit are connected.

Figure 2:
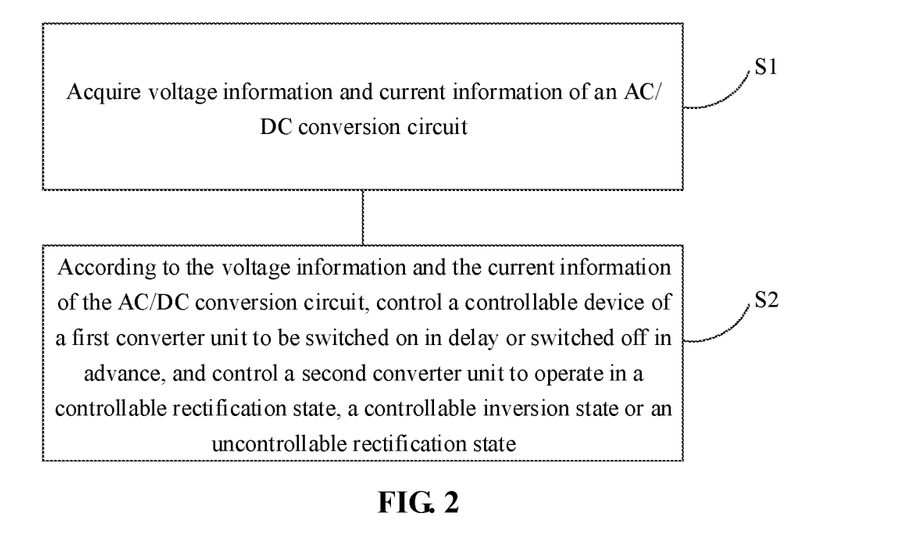
FIG. 2 is a flowchart of a method for controlling an AC/DC conversion circuit according to an embodiment of the disclosure.

With the method for controlling an AC/DC conversion circuit provided in the present embodiment, the AC/DC conversion circuit may be controlled through a valve-level controller of a modular AC/DC conversion circuit of a co-coupling unit structure. The flowchart of the method is as shown in FIG. 2. The method includes the following steps S1 and S2.

In step S1, voltage information and current information of the AC/DC conversion circuit are acquired. Voltage information and current information of the AC/DC conversion circuit may be acquired by a measuring device such as a sensor. Specifically, step S1 may include the following sub-steps S11 and S12.

In sub-step S11, a capacitor voltage and a current of the first converter unit are detected.

In sub-step S12, a fluctuation range of the capacitor voltage of the first converter unit and a power flowing direction of the coupling unit are determined. Specifically, according to the capacitor voltage of three phases and the current of three phases of the first converter unit detected within a certain period of time, the fluctuation range of the capacitor voltage may be obtained to take further control measures to suppress large fluctuations and a current flowing direction may be obtained, thus obtaining a power flowing direction for further control.

In sub-step S2, according to the voltage information and the current information of the AC/DC conversion circuit, a controllable device in the first converter unit is controlled to be switched on in delay or switched off in advance, and the second converter unit is controlled to operate in a controllable rectification state, a controllable inversion state or an uncontrollable rectification state.

Specifically, the control of the AC/DC conversion circuit is realized by determining the fluctuation range of the capacitor voltage. The step of controlling a controllable device in the first converter unit to be switched on in delay or switched off in advance includes the following sub-steps.

In sub-step S21, it is determined whether the fluctuation range of the capacitor voltage of the first converter unit exceeds a preset voltage range. Voltage fluctuation of the actual AC/DC conversion circuit is controlled by presetting a voltage range in which a power device safely operates.

In sub-step S22, in response to the fluctuation range of the capacitor voltage of the first converter unit exceeding the preset voltage range, the controllable device in the first converter unit is controlled to be switched on in delay or switched off in advance. Specifically, a duty ratio of the controllable device in the first converter unit is controlled, that is, duty ratio control is performed on the three-phase DC/AC converter unit connected to an input terminal of a high-frequency coupling unit. In response to the fluctuation range of the capacitor voltage exceeding a preset voltage range, the controllable device is controlled to be switched on in delay. The delay time may be specifically determined according to circuit parameters. By controlling the controllable device to be switched on in delay, a transfer of the reactive power caused by current commutation within a switching period can be effectively avoided. Furthermore, the controllable device in the first converter unit can also be controlled to be switched off in advance, and a time for advance switching-off can be specifically determined according to circuit parameters. Delay switching-on or advance switching-off may be controlled by a controller.

Specifically, the step of controlling the second converter unit to operate in a controllable rectification state, a controllable inversion state or an uncontrollable rectification state includes the following sub-steps S21' and S22'.

In sub-step S21', it is determined whether the power flowing direction of the coupling unit is unidirection from the input terminal to the output terminal of the coupling unit or bidirection. Specifically, the power flowing direction of the coupling unit is determined according to collected voltage and current signals of the DC/AC converter unit. Preferably, it may also be determined based on a power flowing direction signal instruction sent by an upper computer, that is, it is monitored whether a power flowing direction signal instruction is received by a valve-level controller.

In sub-step S22', in response to the power flowing direction of the coupling unit being unidirection from the input terminal to the output terminal of the coupling unit, a trigger pulse of the second converter unit is locked, and the second converter unit is controlled to operate in an uncontrollable rectification state, and in response to receiving an instruction indicating that the power flowing direction of the second converter unit is bidirection, the trigger pulse of the second converter unit is unlocked, and the second converter unit is controlled to operate in a controllable rectification state or a controllable inversion state.

In response to the power flowing direction being unidirection from the input terminal to the output terminal of the high-frequency coupling unit, the AC/DC converter unit is controlled to operate in an uncontrollable rectification state. In a case where the power flowing direction is not unidirection, that is, bidirection, the AC/DC converter unit is controlled to operate in a controllable rectification state or a controllable inversion state, that is, a duty ratio control state same as the duty ratio control state of the DC/AC converter unit applies to the AC/DC converter unit.

As a specific implementation manner, the coupling unit includes an intermediate-frequency transformer, and step S22' of controlling the second converter unit to operate in a controllable rectification state or a controllable inversion state further includes the following sub-step S221'.

In sub-step S221', in response to the power flowing direction being from the second converter unit to the intermediate-frequency transformer, the second converter unit is controlled to operate in a controllable rectification state, or in response to the power flowing direction being from the intermediate-frequency transformer to the second converter unit, the second converter unit is controlled to operate in a controllable inversion state. The second converter unit is thus further controlled to operate in a controllable rectification state or a controllable inversion state according to the power flowing direction.

In the method for controlling an AC/DC conversion circuit provided by the present embodiment, the AC/DC conversion circuit includes a first converter unit, a second converter unit and a coupling unit. The first converter unit is connected to an input terminal of the coupling unit. The second converter unit is connected to an output terminal of the coupling unit. By acquiring voltage information and current information of the AC/DC conversion circuit, a controllable device in the first converter unit is controlled to be switched on in delay or switched off in advance, and meanwhile the second converter unit is controlled to operate in a controllable rectification state, a controllable inversion state or an uncontrollable rectification state. By controlling the capacitor voltage fluctuation and the voltage and current of the coupling unit of the AC/DC conversion circuit, fluctuation of the DC-side capacitor voltage of a module caused by single-phase fluctuation power may be effectively suppressed, thereby preventing over-stressing of the device, solving unbalanced DC-side capacitor voltage in the AC/DC conversion circuit, avoiding a large reactive power oscillation inside the modular AC/DC conversion circuit, and reducing the adverse influence on the device.

As a preferable implementation manner, after step S1, the method further includes the following steps S3 to S5.

In step S3, for first converter units of all phases connected to the same coupling unit, a respective capacitor voltage bias of each of the first converter units is calculated. That is, the biases between the capacitor voltages of the DC/AC converter units of three phases connected to the same coupling unit are calculated.

In step S4, it is determined whether there is one of the biases that exceeds a preset value.

In step S5, in response to one of the biases exceeding the preset value, it is determined to lock a trigger pulse of at least one of the phases according to the bias. That is, the trigger pulse of the DC/AC converter unit of at least one phase with a lower capacitor voltage is selected to be locked, thereby controlling the locking of the trigger pulse in at least one phase with the lower capacitor voltage of the first converter unit.

The capacitor voltage of the DC/AC converter unit of each of the three phases connected to the same coupling unit is detected. When the voltage bias exceeds the preset value, the DC/AC converter unit of at least one phase with a lower capacitor voltage is locked. The AC/DC converter unit at the output terminal of the coupling unit may be controlled according to the power flowing direction of the coupling unit. The method for controlling an AC/DC conversion circuit can effectively solve unbalanced DC-side capacitor voltage in the AC/DC conversion circuit, effectively suppress the fluctuation of the DC-side capacitor voltage of a module caused by single-phase fluctuation power, and prevent over-stressing of the device.

Figure 3:
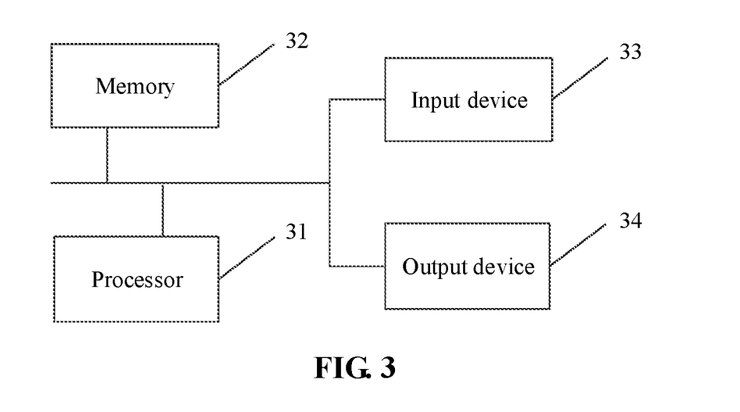
FIG. 3 is a schematic diagram of an apparatus for controlling an AC/DC conversion circuit according to an embodiment of the disclosure.

The present embodiment further provides an apparatus for controlling an AC/DC conversion circuit. A hardware structure of the apparatus is shown in FIG. 3, including at least one processor 31 and a memory 32 communicated and connected to the at least one processor, as exemplified by one processor 31 in FIG. 3. The apparatus may further include an input device 33 and an output device 34.

The processor 31, the memory 32, the input device 33, and the output device 34 may be connected by a bus or in other manners, as exemplified by bus connection in FIG. 3.

The processor 31 may be a Central Processing Unit (CPU). The processor 31 may also be another general-purpose processor, a Digital Signal Processor (DSP), an Application Specific Integrated Circuit (ASIC), a Field-Programmable Gate Array (FPGA), or other programmable logic devices, discrete gates or transistor logic devices, discrete hardware components or other chips, or a combination of the above chips. The general-purpose processor may be a microprocessor, or the processor may be any conventional processor.

The input device 33 may receive parameter information for controlling an AC/DC conversion circuit and a control instruction sent by an upper computer. The output device 34 may include a display device such as a display screen for outputting information such as an operating state of the AC/DC conversion circuit.

The memory stores an instruction which may be executed by the at least one processor. The instruction is executed by the at least one processor such that the at least one processor performs the above method for controlling an AC/DC conversion circuit.

It is to be noted that, when the apparatus for controlling an AC/DC conversion circuit provided by the foregoing embodiment controls the AC/DC conversion circuit, only the division of each of the foregoing program modules is illustrated. In actual applications, the processing allocation may be completed by different program modules as needed. The internal structure of the apparatus is divided into different program modules to perform all or part of the processing described above. In addition, the apparatus for controlling an AC/DC conversion circuit provided in the foregoing embodiment is in the same concept as the method for controlling an AC/DC conversion circuit, the specific implementation process is described in detail in the method embodiment, and details are not described herein again.

In the apparatus for controlling an AC/DC conversion circuit provided by the present embodiment, the AC/DC conversion circuit includes a first converter unit, a second converter unit and a coupling unit. The first converter unit is connected to an input terminal of the coupling unit. The second converter unit is connected to an output terminal of the coupling unit. By acquiring voltage information and current information of the AC/DC conversion circuit, a controllable device in the first converter unit is controlled to be switched on in delay or switched off in advance. The second converter unit is controlled to operate in a controllable rectification state, a controllable inversion state or an uncontrollable rectification state. By controlling the capacitor voltage fluctuation and the voltage and current of the coupling unit of the AC/DC conversion circuit, the fluctuation of the DC-side capacitor voltage of a module caused by single-phase fluctuation power may be effectively suppressed, thereby preventing over-stressing of the device, solving unbalanced DC-side capacitor voltage in the AC/DC conversion circuit, avoiding a large reactive power oscillation inside the modular AC/DC conversion circuit, and reducing the adverse influence on the device.

The present embodiment further provides a computer-readable storage medium, which has a computer program stored thereon. The computer program is executed by a processor to implement the steps of the method for controlling an AC/DC conversion circuit according to the embodiment of the disclosure.

In the several embodiments provided by the present application, it should be understood that the disclosed apparatuses, and methods may be implemented in other manners. The apparatus embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed between various components may be indirect coupling or communication connection between devices or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the disclosure may be all integrated into one processing unit, or each unit may exist physically separately, or two or more units may be integrated into one unit. The integrated unit may be implemented in the form of hardware or in the form of hardware and software functional units.

Those of ordinary skill in the art can understand that all or part of the steps of implementing the above method embodiments may be completed by using hardware related to program instructions, and the foregoing program may be stored in a computer readable storage medium, and the program is executed to perform the steps in the above method embodiments. The foregoing storage medium includes various media capable of storing program codes such as a mobile storage device, a Read-Only Memory (ROM), a Random Access Memory (RAM), a magnetic disk, or an optical disc.

Or, the integrated unit in the disclosure may be stored in a computer-readable storage medium if being implemented in the form of a software function module and sold or used as a standalone product. Based on such understanding, the essence of the technical solution of the embodiments of the disclosure or a part contributing to the conventional art may be embodied in the form of a software product that is stored in a storage medium, including a plurality of instructions used to cause a computer device (which may be a personal computer, a server, or a network device, etc.) to perform all or part of the methods described in various embodiments of the disclosure. The foregoing storage medium includes: various media capable of storing program codes, such as a mobile storage device, a ROM, a RAM, a magnetic disk, or an optical disc.

The above is only the specific implementation manner of the disclosure, but the scope of protection of the disclosure is not limited thereto. Any person skilled in the art can easily think of changes or replacements within the technical scope disclosed by the disclosure, which should be covered by the scope of protection of the disclosure. Therefore, the scope of protection of the disclosure should be determined by the scope of the claims.

The invention claimed is:

1. A method for controlling an alternating current-direct current (AC/DC) conversion circuit, wherein the AC/DC conversion circuit comprises a first converter unit, a second converter unit and a coupling unit, the first converter unit is connected to an input terminal of the coupling unit, the second converter unit is connected to an output terminal of the coupling unit, the method comprises:
  acquiring voltage information and current information of the AC/DC conversion circuit; and
  controlling, according to the voltage information and the current information of the AC/DC conversion circuit, a controllable device in the first converter unit to be switched on in delay or switched off in advance, and controlling the second converter unit to operate in a controllable rectification state or a controllable inversion state or an uncontrollable rectification state;
  wherein after acquiring voltage information and current information of the AC/DC conversion circuit, the method further comprises:
  calculating capacitor voltage biases, each for a respective one of first converter units of all phases connected to the same coupling unit;
  determining whether there is a capacitor voltage bias among the capacitor voltage biases exceeding a preset value; and
  in response to that there is a capacitor voltage bias exceeding the preset value, determining to lock a trigger pulse of at least one of the phases according to the capacitor voltage bias exceeding the preset value.

2. The method according to claim 1, wherein the first converter unit is a direct current-alternating current (DC/AC) conversion unit, the second converter unit is an AC/DC conversion unit, and the acquiring voltage information and current information of the AC/DC conversion circuit comprises:
  detecting a capacitor voltage and a current of the first converter unit; and
  determining a fluctuation range of the capacitor voltage or a current fluctuation range of the first converter unit.

3. The method according to claim 2, wherein the controlling the controllable device in the first converter unit to be switched on in delay or switched off in advance comprises:
  determining whether the fluctuation range of the capacitor voltage of the first converter unit exceeds a preset voltage range or whether the current fluctuation range of the first converter unit exceeds a preset current range; and
  in response to the fluctuation range of the capacitor voltage of the first converter unit exceeding the preset voltage range or the current fluctuation range of the first converter unit exceeding the preset current range, controlling the controllable device in the first converter unit to be switched on in delay or switched off in advance, the range of voltage or current fluctuation determines a size of a dead zone.

4. The method according to claim 1, wherein the controlling the second converter unit to operate in the controllable rectification state, the controllable inversion state or the uncontrollable rectification state comprises:
  determining whether a power flowing direction of the coupling unit is unidirection from the input terminal to the output terminal of the coupling unit or bidirection; and
  in response to the power flowing direction of the coupling unit being unidirection from the input terminal to the output terminal of the coupling unit, locking a trigger pulse of the second converter unit, and controlling the second converter unit to operate in the uncontrollable rectification state; or in response to receiving an instruction indicating that the power flowing direction of the coupling unit is bidirection, unlocking a trigger pulse of the second converter unit, and controlling the second converter unit to operate in the controllable rectification state or the controllable inversion state.

5. The method according to claim 4, wherein the coupling unit comprises an intermediate-frequency transformer, and the controlling the second converter unit to operate in the controllable rectification state or the controllable inversion state comprises:
   in response to the power flowing direction of the coupling unit being from the second converter unit to the intermediate-frequency transformer, controlling the second converter unit to operate in the controllable rectification state, or
   in response to the power flowing direction of the coupling unit being from the intermediate-frequency transformer to the second converter unit, controlling the second converter unit to operate in the controllable inversion state.

6. An apparatus for controlling an alternating current-direct current (AC/DC) conversion circuit, comprising:
   at least one processor; and
   a memory communicated and connected to the at least one processor,
   wherein the memory stores instructions executable by the at least one processor, the instructions, when executed by the at least one processor, cause the at least one processor to perform a method comprising:
   acquiring voltage information and current information of the AC/DC conversion circuit; and
   controlling, according to the voltage information and the current information of the AC/DC conversion circuit, a controllable device in a first converter unit to be switched on in delay or switched off in advance, and controlling a second converter unit to operate in a controllable rectification state or a controllable inversion state or an uncontrollable rectification state,
   wherein after acquiring voltage information and current information of the AC/DC conversion circuit, the method further comprises:
   calculating capacitor voltage biases, each for a respective one of first converter units of all phases connected to the same coupling unit;
   determining whether there is a capacitor voltage bias among the capacitor voltage biases exceeding a preset value; and
   in response to that there is a capacitor voltage bias exceeding the preset value, determining to lock a trigger pulse of at least one of the phases according to the capacitor voltage bias exceeding the preset value; and
   wherein the AC/DC conversion circuit comprises the first converter unit, the second converter unit and a coupling unit, the first converter unit is connected to an input terminal of the coupling unit, the second converter unit is connected to an output terminal of the coupling unit.

7. The apparatus according to claim 6, wherein the acquiring voltage information and current information of the AC/DC conversion circuit comprises:
   detecting a capacitor voltage and a current of the first converter unit; and
   determining a fluctuation range of the capacitor voltage or a current fluctuation range of the first converter unit; and
   wherein the first converter unit is a direct current-alternating current (DC/AC) conversion unit, the second converter unit is an AC/DC conversion unit.

8. The apparatus according to claim 7, wherein the controlling the controllable device in the first converter unit to be switched on in delay or switched off in advance comprises:
   determining whether the fluctuation range of the capacitor voltage of the first converter unit exceeds a preset voltage range or whether the current fluctuation range of the first converter unit exceeds a preset current range; and
   in response to the fluctuation range of the capacitor voltage of the first converter unit exceeding the preset voltage range or the current fluctuation range of the first converter unit exceeding the preset current range, controlling the controllable device in the first converter unit to be switched on in delay or switched off in advance, the range of voltage or current fluctuation determines a size of a dead zone.

9. The apparatus according to claim 6, wherein the controlling the second converter unit to operate in the controllable rectification state, the controllable inversion state or the uncontrollable rectification state comprises:
   determining whether a power flowing direction of the coupling unit is unidirection from the input terminal to the output terminal of the coupling unit or bidirection; and
   in response to the power flowing direction of the coupling unit being unidirection from the input terminal to the output terminal of the coupling unit, locking a trigger pulse of the second converter unit, and controlling the second converter unit to operate in the uncontrollable rectification state; or in response to receiving an instruction indicating that the power flowing direction of the coupling unit is bidirection, unlocking a trigger pulse of the second converter unit, and controlling the second converter unit to operate in the controllable rectification state or the controllable inversion state.

10. The apparatus according to claim 9, wherein the controlling the second converter unit to operate in the controllable rectification state or the controllable inversion state comprises:
    in response to the power flowing direction of the coupling unit being from the second converter unit to an intermediate-frequency transformer, controlling the second converter unit to operate in the controllable rectification state, or
    in response to the power flowing direction of the coupling unit being from the intermediate-frequency transformer to the second converter unit, controlling the second converter unit to operate in the controllable inversion state; and
    wherein the coupling unit comprises the intermediate-frequency transformer.

11. A non-transitory computer-readable storage medium, in which a computer program is stored, wherein the computer program is executed by a processor to implement a method comprising:
    acquiring voltage information and current information of the AC/DC conversion circuit; and
    controlling, according to the voltage information and the current information of the AC/DC conversion circuit, a controllable device in a first converter unit to be switched on in delay or switched off in advance, and controlling a second converter unit to operate in a controllable rectification state or a controllable inversion state or an uncontrollable rectification state, wherein after acquiring voltage information and current information of the AC/DC conversion circuit, the method further comprises:

calculating capacitor voltage biases, each for a respective one of first converter units of all phases connected to the same coupling unit;

determining whether there is a capacitor voltage bias among the capacitor voltage biases exceeding a preset value; and in response to that there is a capacitor voltage bias exceeding the reset value determining to lock a trigger pulse of at least one of the phases according to the capacitor voltage bias exceeding the preset value; and wherein the AC/DC conversion circuit comprises the first converter unit, the second converter unit and a coupling unit, the first converter unit is connected to an input terminal of the coupling unit, the second converter unit is connected to an output terminal of the coupling unit.

12. The non-transitory computer-readable storage medium according to claim 11, wherein the acquiring voltage information and current information of the AC/DC conversion circuit comprises:

detecting a capacitor voltage and a current of the first converter unit; and determining a fluctuation range of the capacitor voltage or a current fluctuation range of the first converter unit; and wherein the first converter unit is a direct current-alternating current (DC/AC) conversion unit, the second converter unit is an AC/DC conversion unit.

13. The non-transitory computer-readable storage medium according to claim 12, wherein the controlling the controllable device in the first converter unit to be switched on in delay or switched off in advance comprises:

determining whether the fluctuation range of the capacitor voltage of the first converter unit exceeds a preset voltage range or whether the current fluctuation range of the first converter unit exceeds a preset current range; and in response to the fluctuation range of the capacitor voltage of the first converter unit exceeding the preset voltage range or the current fluctuation range of the first converter unit exceeding the preset current range, controlling the controllable device in the first converter unit to be switched on in delay or switched off in advance, the range of voltage or current fluctuation determines a size of a dead zone.

14. The non-transitory computer-readable storage medium according to claim 11, wherein the controlling the second converter unit to operate in the controllable rectification state, the controllable inversion state or the uncontrollable rectification state comprises:

determining whether a power flowing direction of the coupling unit is unidirection from the input terminal to the output terminal of the coupling unit or bidirection; and in response to the power flowing direction of the coupling unit being unidirection from the input terminal to the output terminal of the coupling unit, locking a trigger pulse of the second converter unit, and controlling the second converter unit to operate in the uncontrollable rectification state; or in response to receiving an instruction indicating that the power flowing direction of the coupling unit is bidirection, unlocking a trigger pulse of the second converter unit, and controlling the second converter unit to operate in the controllable rectification state or the controllable inversion state.

15. The non-transitory computer-readable storage medium according to claim 14, wherein the controlling the second converter unit to operate in the controllable rectification state or the controllable inversion state comprises:

in response to the power flowing direction of the coupling unit being from the second converter unit to an intermediate-frequency transformer, controlling the second converter unit to operate in the controllable rectification state, or in response to the power flowing direction of the coupling unit being from the intermediate-frequency transformer to the second converter unit, controlling the second converter unit to operate in the controllable inversion state; and wherein the coupling unit comprises the intermediate-frequency transformer.

* * * * *